US008658708B2

(12) United States Patent
Loh et al.

(10) Patent No.: US 8,658,708 B2
(45) Date of Patent: Feb. 25, 2014

(54) FOAM-FORMING COMPOSITIONS CONTAINING AZEOTROPIC OR AZEOTROPE-LIKE MIXTURES CONTAINING Z-1,1,1,4,4,4-HEXAFLUORO-2-BUTENE AND METHYL FORMATE AND THEIR USES IN THE PREPARATION OF POLYISOCYANATE-BASED FOAMS

(75) Inventors: Gary Loh, Newark, DE (US); Mark L. Robin, Middletown, DE (US); Joseph Anthony Creazzo, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 75 days.

(21) Appl. No.: 12/808,560

(22) PCT Filed: Dec. 17, 2008

(86) PCT No.: PCT/US2008/087227
§ 371 (c)(1),
(2), (4) Date: Jun. 16, 2010

(87) PCT Pub. No.: WO2009/085857
PCT Pub. Date: Jul. 9, 2009

(65) Prior Publication Data
US 2011/0218261 A1 Sep. 8, 2011

Related U.S. Application Data

(60) Provisional application No. 61/015,061, filed on Dec. 19, 2007, provisional application No. 61/015,027, filed on Dec. 19, 2007, provisional application No. 61/015,086, filed on Dec. 19, 2007, provisional application No. 61/015,089, filed on Dec. 19, 2007, provisional application No. 61/015,092, filed on Dec. 19, 2007, provisional application No. 61/015,214, filed on Dec. 20, 2007, provisional application No. 61/015,218, filed on Dec. 20, 2007, provisional application No. 61/015,221, filed on Dec. 20, 2007.

(51) Int. Cl.
C08J 9/14 (2006.01)
(52) U.S. Cl.
USPC ............... 521/131; 252/182.24; 252/182.27; 521/130; 521/164; 521/167; 521/170; 521/174
(58) Field of Classification Search
USPC ................. 521/130, 131, 164, 167, 170, 174; 252/182.24, 182.27
See application file for complete search history.

(56) References Cited

U.S. PATENT DOCUMENTS

| | | |
|---|---|---|
| 3,085,918 A | 4/1963 | Sherliker et al. |
| 3,723,318 A | 3/1973 | Butler |
| 3,884,828 A | 5/1975 | Butler |
| 4,085,073 A | 4/1978 | Loukes |
| 4,394,491 A | 7/1983 | Hoffman |
| 4,613,708 A | 9/1986 | Riess et al. |
| 4,704,410 A | 11/1987 | Booth et al. |
| 4,704,411 A | 11/1987 | Gansow et al. |
| 4,945,119 A * | 7/1990 | Smits et al. ............... 521/131 |
| 5,037,572 A | 8/1991 | Merchant |
| 5,164,419 A | 11/1992 | Bartlett et al. |
| 5,204,159 A | 4/1993 | Tan |
| 5,332,761 A | 7/1994 | Paquet et al. |
| 5,463,150 A | 10/1995 | Lui et al. |
| 5,578,137 A | 11/1996 | Shealy |
| 5,631,306 A * | 5/1997 | Dams et al. ............... 521/131 |
| 5,773,404 A | 6/1998 | Aoyama et al. |
| 5,883,146 A * | 3/1999 | Tucker ....................... 521/174 |
| 5,900,185 A | 5/1999 | Tapscott |
| 5,908,822 A | 6/1999 | Dishart |
| 5,977,271 A | 11/1999 | McKay et al. |
| 6,046,247 A * | 4/2000 | Gluck et al. ............... 521/99 |
| 6,071,580 A | 6/2000 | Bland et al. |
| 6,590,005 B2 | 7/2003 | Singh et al. |
| 6,610,250 B1 | 8/2003 | Tuma |
| 6,703,431 B2 | 3/2004 | Dietzen et al. |
| 6,787,580 B2 | 9/2004 | Chonde et al. |
| 2004/0119047 A1 | 6/2004 | Singh et al. |
| 2004/0256594 A1 | 12/2004 | Singh et al. |

(Continued)

FOREIGN PATENT DOCUMENTS

| | | |
|---|---|---|
| DE | 2534315 | 2/1976 |
| EP | 0558763 A1 | 8/1993 |

(Continued)

OTHER PUBLICATIONS

H. Boden et. al., Chapter 4, Polyurethane Handbook, Edited by G. Oertel, Hanser Publishers, NY 1985.
H. Grunbauer et. al., "Fine Celled CFC-Free Rigid Roam—New Machinery With Low Boiling Blowing Agents", Published in Polyurethanes 92 From the Proceeding of the SPI 34th Annual Technical/Marketing Conference, Oct. 21-24, 1992, New Orleans, Louisiana.
M. Taverna et. al., "Soluble or Insoluble Alternative Blowing Agents? Processing Technologies for Both Alternatives, Presented by Equipment Manufacturer", Published in Polyurethanes World Congress 1991 From the Proceedings of the SPI/SOPA Sep. 24-26, 1991, Acropolis, Nice, France.

(Continued)

Primary Examiner — John Cooney

(57) ABSTRACT

Foam-forming compositions containing azeotropic or azeotrope-like mixtures containing cis-1,1,1,4,4,4-hexafluoro-2-butene are disclosed. The foam-forming composition contains (a) an azeotropic or azeotrope-like mixture of cis-1,1,1,4,4,4-hexafluoro-2-butene with methyl formate, 1,1,1,3,3-pentafluorobutane, trans-1,2-dichloroethylene, pentane, isopentane, cyclopentane, HFC-245fa, or dimethoxymethane; and (b) an active hydrogen-containing compound having two or more active hydrogens. Also disclosed is a closed-cell polyurethane or polyisocyanurate polymer foam prepared from reaction of an effective amount of the foam-forming composition with a suitable polyisocyanate. Also disclosed is a process for producing a closed-cell polyurethane or polyisocyanurate polymer foam by reacting an effective amount of the foam-forming composition with a suitable polyisocyanate.

10 Claims, No Drawings

(56) References Cited

U.S. PATENT DOCUMENTS

| | | | |
|---|---|---|---|
| 2005/0233934 A1 | 10/2005 | Singh et al. | |
| 2006/0266975 A1* | 11/2006 | Nappa et al. | 252/67 |
| 2007/0077488 A1 | 4/2007 | Chen et al. | |
| 2007/0096051 A1 | 5/2007 | Nappa et al. | |
| 2007/0098646 A1 | 5/2007 | Nappa et al. | |
| 2007/0100009 A1 | 5/2007 | Creazzo et al. | |
| 2007/0100010 A1 | 5/2007 | Creazzo et al. | |
| 2007/0100011 A1 | 5/2007 | Creazzo et al. | |
| 2007/0102021 A1 | 5/2007 | Nappa et al. | |
| 2007/0105738 A1 | 5/2007 | Nappa et al. | |
| 2007/0108403 A1 | 5/2007 | Sievert et al. | |
| 2007/0203046 A1 | 8/2007 | Minor et al. | |
| 2008/0269532 A1 | 10/2008 | Swearingen | |

FOREIGN PATENT DOCUMENTS

| | | |
|---|---|---|
| EP | 0398147 B1 | 9/1994 |
| EP | 0731162 A1 | 11/1996 |
| EP | 350316 B1 | 2/1997 |
| EP | 1219674 A1 | 3/2002 |
| GB | 950876 | 2/1964 |
| JP | 179043 | 7/1993 |
| JP | 05179043 | 7/1993 |
| WO | 94/23008 A1 | 10/1994 |
| WO | 03/068838 A1 | 8/2003 |
| WO | 2004/037913 A2 | 5/2004 |
| WO | 2005/099718 A1 | 10/2005 |
| WO | 2006/101882 A2 | 9/2006 |
| WO | 2008/057513 A1 | 5/2008 |
| WO | 2008/134061 A2 | 11/2008 |
| WO | 2008/154612 A1 | 12/2008 |
| WO | 2009/014965 A1 | 1/2009 |
| WO | 2009/014966 A1 | 1/2009 |
| WO | 2009/032983 A1 | 3/2009 |
| WO | 2009/073487 A1 | 6/2009 |
| WO | 2009/085857 A2 | 7/2009 |

OTHER PUBLICATIONS

Santini G. et. al., "The Reaction of Perfluoroalkylcopper Compounds With 1-Bromo-Perfluoroalkyethylenes", Tetrahedron, vol. 29, 1973, pp. 2411-2414, XP002427778, Table 3; Compound 2A, 2B.

Devallezbernard et. al., "Solubility of Respiratory Gases in the 1, 2-Bis(F-Alkyl) Ethenes", Journal De Chimie Physique, Societe De Chimie Physique, Paris, France, vol. 85, No. 10, 1988, pp. 947-952, XP008077143.

Gao et al., "Dip-Coating of Ultra Think Liquid Lubricant and Its Control for Thin-Film Magnetic Hard Disks", IEEE Transactions on Magnetics, vol. 31, No. 6, 1995, pp. 2982-2984.

Le Blanc M et. al., "A Strategy for the Synthesis of Pure, Inert Perfluoroalkylated Derivatives Designed for Flood Substitution", Oxygen Carrying C9olloidal Blood Substitutes, Iinternational Symposium Perfluorochem Blood Substitutes, 1982, pp. 43-49, XP008077176.

F. Jeanneaux et al., "Additional Thermique Des IODO-1-Perfluoroalcanes Sur Les Perfluoroalkylethylenes", Journal of Fluorine Chemistry, 4 (1974), pp. 261-270.

World Meteorological Organization Global Ozone Research and Monitoring Project, Scientific Assessment of Ozone Depletion: 2002, "Source Gases", Report No. 47, Published Mar. 2003, pp. 1.28-1.31.

Skochdopole, R. E. et. al., "Polystyrene Foams", Encyclopedia of Polymer Science, vol. 16 (1989), p. 193-206.

Pedler A. E. et. al., "The Synthesis and Dehydroflurination of Some Polyfluoroalkanes", J. Fluorine Chem., vol. 1 No. 3, 1972, pp. 337-345, XP002427764.

M. F. Doherty and M.F. Malone, Conceptual Design of Distillation Systems, McGraw-Hill (New York), 2001, 185-186, 351-359).

"Phase Equilibrium in Process Design", Wiley-Interscience Publisher, 1970, written by Harold R. Null, on pp. 124 to 126.

"The Properties of Gases and Liquids," 4th edition, published by McGraw Hill, written by Reid, Prausnitz and Poling, on pp. 241 to 387.

"Phase Equilibria in Chemical Engineering," published by Butterworth Publishers, 1985, written by Stanley M. Walas, pp. 165 to 244.

"Non-combustible foaming agent consisting of cis-hexa: fluoro: butene—is useful for thermal insulation, uniformity, mechanical strength and compression", vol. 1993, No. 33, Jul. 20, 1993. XP002498569.

* cited by examiner

FOAM-FORMING COMPOSITIONS CONTAINING AZEOTROPIC OR AZEOTROPE-LIKE MIXTURES CONTAINING Z-1,1,1,4,4,4-HEXAFLUORO-2-BUTENE AND METHYL FORMATE AND THEIR USES IN THE PREPARATION OF POLYISOCYANATE-BASED FOAMS

This application claims priority of U.S. Patent Applications 61/015,061, 61/015,027, 61/015,086, 61/015,089 and 61/015,092 filed Dec. 19, 2007, U.S. Patent Applications 61/015,214, 61/015,218 and 61/015,221 filed Dec. 20, 2007.

FIELD OF THE INVENTION

The disclosure herein relates to foam-forming compositions comprising (a) an azeotropic or azeotrope-like mixture comprising cis-1,1,1,4,4,4-hexafluoro-2-butene and (b) an active hydrogen-containing compounds, and using such compositions for producing polyurethane and polyisocyanurate foams.

BACKGROUND OF THE INVENTION

Closed-cell polyisocyanate-based foams are widely used for insulation purposes, for example, in building construction and in the manufacture of energy efficient electrical appliances. In the construction industry, polyurethane/polyisocyanurate board stock is used in roofing and siding for its insulation and load-carrying capabilities. Poured and sprayed polyurethane foams are widely used for a variety of applications including insulating roofs, insulating large structures such as storage tanks, insulating appliances such as refrigerators and freezers, insulating refrigerated trucks and railcars, etc.

All of these various types of polyurethane/polyisocyanurate foams require blowing agents for their manufacture. Insulating foams depend on the use of halocarbon blowing agents, not only to foam the polymer, but primarily for their low vapor thermal conductivity, a very important characteristic for insulation value. Historically, polyurethane foams used CFCs (chlorofluorocarbons, for example CFC-11, trichlorofluoromethane) and HCFCs (hydrochlorofluorocarbons, for example HCFC-141b, 1,1-dichloro-1-fluoroethane) as the primary blowing agent. However, due to the implication of chlorine-containing molecules such as the CFCs and HCFCs in the destruction of stratospheric ozone, the production and use of CFCs and HCFCs has been restricted by the Montreal Protocol. More recently, hydrofluorocarbons (HFCs), which do not contribute to the destruction of stratospheric ozone, have been employed as blowing agents for polyurethane foams. An example of an HFC employed in this application is HFC-245fa (1,1,1,3,3-pentafluoropropane). The HFCs do not contribute to the destruction of stratospheric ozone, but are of concern due to their contribution to the "greenhouse effect", i.e., they contribute to global warming. As a result of their contribution to global warming, the HFCs have come under scrutiny, and their widespread use may also be limited in the future.

Hydrocarbons have also been proposed as foam blowing agents. However, these compounds are flammable, and many are photochemically reactive, and as a result contribute to the production of ground level ozone (i.e., smog). Such compounds are typically referred to as volatile organic compounds (VOCs), and are subject to environmental regulations.

There is need for producing foams that provide low flammability, good thermal insulation and high dimensional stability by using a blowing agent that has substantially no ozone depletion potential (ODP) and no or very low global warming potential (GWP). Cis-1,1,1,4,4,4-hexafluoro-2-butene (Z-FC-1336mzz, or Z—$CF_3CH=CHCF_3$) is one of the good candidates.

Japanese Patent No. 05179043 discloses and attempts to use cis-1,1,1,4,4,4-hexafluoro-2-butene as the blowing agent for polyurethane foams.

SUMMARY OF THE INVENTION

This application includes eight different types of foam-forming compositions, each of which comprises an azeotropic or azeotrope-like mixture of cis-1,1,1,4,4,4-hexafluoro-2-butene.

This disclosure provides a foam-forming composition comprising: (a) an azeotropic or azeotrope-like mixture of cis-1,1,1,4,4,4-hexafluoro-2-butene and methyl formate; and (b) an active hydrogen-containing compound having two or more active hydrogens.

This disclosure provides a foam-forming composition comprising: (a) an azeotrope-like mixture of cis-1,1,1,4,4,4-hexafluoro-2-butene and 1,1,1,3,3-pentafluorobutane; and (b) an active hydrogen-containing compound having two or more active hydrogens.

This disclosure provides a foam-forming composition comprising: (a) an azeotropic or azeotrope-like mixture of cis-1,1,1,4,4,4-hexafluoro-2-butene and trans-1,2-dichloroethylene; and (b) an active hydrogen-containing compound having two or more active hydrogens.

This disclosure provides a foam-forming composition comprising: (a) an azeotropic or azeotrope-like mixture of cis-1,1,1,4,4,4-hexafluoro-2-butene and pentane; and (b) an active hydrogen-containing compound having two or more active hydrogens.

This disclosure provides a foam-forming composition comprising: (a) an azeotropic or azeotrope-like mixture of cis-1,1,1,4,4,4-hexafluoro-2-butene and isopentane; and (b) an active hydrogen-containing compound having two or more active hydrogens.

This disclosure provides a foam-forming composition comprising: (a) an azeotropic or azeotrope-like mixture of cis-1,1,1,4,4,4-hexafluoro-2-butene and cyclopentane; and (b) an active hydrogen-containing compound having two or more active hydrogens.

This disclosure provides a foam-forming composition comprising: (a) an azeotrope-like mixture of cis-1,1,1,4,4,4-hexafluoro-2-butene and HFC-245fa; and (b) an active hydrogen-containing compound having two or more active hydrogens.

This disclosure provides a foam-forming composition comprising: (a) an azeotrope-like mixture of cis-1,1,1,4,4,4-hexafluoro-2-butene and dimethoxymethane; and (b) an active hydrogen-containing compound having two or more active hydrogens.

This disclosure also provides a closed-cell polyurethane or polyisocyanurate polymer foam prepared from the reaction of an effective amount of the foam-forming composition and a suitable polyisocyanate.

This disclosure also provides a method for producing a closed-cell polyurethane or polyisocyanurate polymer foam. The method comprises reacting an effective amount of the foam-forming composition and a suitable polyisocyanate.

DETAILED DESCRIPTION

A blowing agent composition (also known as foam expansion agents or foam expansion compositions) often desires a pure single component or an azeotropic or azeotrope-like mixture. For example, when a blowing agent composition is not a pure single component or an azeotropic or azeotrope-like mixture, the composition may change during its application in the foam forming process. Such change in composition could detrimentally affect processing or cause poor performance in the application. Accordingly, there is need for producing polyurethane/polyisocyanurate foams by using azeotropic or azeotrope-like mixtures containing Z-FC-1336mzz as the blowing agent.

Before addressing details of embodiments described below, some terms are defined or clarified.

By "cream time", it is meant to refer to the time period starting from the mixing of the active hydrogen-containing compound with polyisocyanate, and ending at when the foaming starts to occur and color of the mixture starts to change.

By "rise time", it is meant to refer to the time period starting from the mixing of the active hydrogen-containing compound with polyisocyanate, and ending at when the foam rising stops.

By "tack free time", it is meant to refer to the time period starting from the mixing of the active hydrogen-containing compound with polyisocyanate, and ending at when the surface of the foam is no longer tacky.

By "initial R-value", it is meant to refer to the polymer foam's insulation value (thermal resistance) measured at a mean temperature of 75° F. within 24 hours after the foam is formed and becomes tack free.

Z-FC-1336mzz is a known compound, and its preparation method has been disclosed, for example, in U.S. Patent Publication No. US2008/0269532, hereby incorporated by reference in its entirety.

This application includes foam-forming compositions comprising (a) an azeotropic or azeotrope-like mixture comprising Z-FC-1336mzz; and (b) an active hydrogen-containing compound.

In some embodiments of this invention, the foam-forming composition comprises: (a) an azeotropic or azeotrope-like mixture of Z-FC-1336mzz and methyl formate; and (b) an active hydrogen-containing compound having two or more active hydrogens, in the form of hydroxyl groups. In this disclosure, the azeotropic or azeotrope-like mixture of Z-FC-1336mzz and methyl formate is used as a blowing agent. Blowing agents Z-FC-1336mzz and methyl formate form an azeotrope-like mixture. Typically these are combined prior to mixing with the other components in the foam-forming compositions. Alternatively, one can be mixed with some or all of the other components before the other is mixed in. For example, Z-FC-1336mzz can be first mixed with the other components in the foam-forming compositions before methyl formate is added in. In one embodiment, the azeotrope like mixture contains between 1-99% by weight of Z-FC-1336mzz, and 99-1% by weight of methyl formate. In one embodiment, the azeotrope like mixture contains between 50-92% by weight of Z-FC-1336mzz and 50-8% by weight of methyl formate. In one embodiment, the azeotrope like mixture contains 90% by weight of Z-FC-1336mzz and 10% by weight of methyl formate.

The azeotropic or azeotrope-like mixtures of Z-FC-1336mzz and methyl formate has been described in U.S. Patent Application No. 60/926,617 [FL1369 US PRV] filed Apr. 27, 2007, hereby incorporated by reference in its entirety.

In some embodiments of this invention, the foam-forming composition comprises: (a) an azeotrope-like mixture of Z-FC-1336mzz and 1,1,1,3,3-pentafluorobutane; and (b) an active hydrogen-containing compound having two or more active hydrogens, in the form of hydroxyl groups. In this disclosure, the azeotrope-like mixture of Z-FC-1336mzz and 1,1,1,3,3-pentafluorobutane (HFC-365mfc, or $CF_3CH_2CF_2CH_3$) is used as a blowing agent. Blowing agents Z-FC-1336mzz and HFC-365mfc form an azeotrope-like mixture. Typically these are combined prior to mixing with the other components in the foam-forming compositions. Alternatively, one can be mixed with some or all of the other components before the other is mixed in. For example, Z-FC-1336mzz can be first mixed with the other components in the foam-forming compositions before HFC-365mfc is added in. In one embodiment, the azeotrope like mixture contains between 1-99% by weight of Z-FC-1336mzz, and 99-1% by weight of HFC-365mfc. In one embodiment, the azeotrope like mixture contains between 45-95% by weight of Z-FC-1336mzz and 55-5% by weight of HFC-365mfc. In one embodiment, the azeotrope like mixture contains 80% by weight of Z-FC-1336mzz and 20% by weight of HFC-365mfc.

The azeotrope-like mixtures of Z-FC-1336mzz and HFC-365mfc has been described in U.S. Patent Application No. 60/930,383 [FL1401 US PRV] filed May 16, 2007, hereby incorporated by reference in its entirety.

In some embodiments of this invention, the foam-forming composition comprises: (a) an azeotropic or azeotrope-like mixture of Z-FC-1336mzz and trans-1,2-dichloroethylene; and (b) an active hydrogen-containing compound having two or more active hydrogens, in the form of hydroxyl groups. In this disclosure, the azeotropic or azeotrope-like mixture of Z-FC-1336mzz and trans-1,2-dichloroethylene (trans-1,2-DCE, or trans-ClCH=CHCl) is used as a blowing agent. Blowing agents Z-FC-1336mzz and trans-1,2-dichloroethylene form an azeotrope-like mixture. Typically these are combined prior to mixing with the other components in the foam-forming compositions. Alternatively, one can be mixed with some or all of the other components before the other is mixed in. For example, Z-FC-1336mzz can be first mixed with the other components in the foam-forming compositions before trans-1,2-dichloroethylene is added in. In one embodiment, the azeotrope like mixture contains between 66-99% by weight of Z-FC-1336mzz, and 34-1% by weight of trans-1,2-dichloroethylene. In one embodiment, the azeotrope like mixture contains between 68-95% by weight of Z-FC-1336mzz and 32-5% by weight of trans-1,2-dichloroethylene. In one embodiment, the azeotropic mixture contains 74.7% by weight of Z-FC-1336mzz and 25.3% by weight of trans-1,2-dichloroethylene. In one embodiment, the azeotrope like mixture contains 68% by weight of Z-FC-1336mzz and 32% by weight of trans-1,2-dichloroethylene The azeotropic or azeotrope-like mixtures of Z-FC-1336mzz and trans-1,2-dichloroethylene has been described in U.S. Patent Application No. 60/931,960 [FL1404 US PRV] filed May 24, 2007, hereby incorporated by reference in its entirety.

In some embodiments of this invention, the foam-forming composition comprises: (a) an azeotropic or azeotrope-like mixture of Z-FC-1336mzz and pentane; and (b) an active hydrogen-containing compound having two or more active hydrogens, in the form of hydroxyl groups. In this disclosure, the azeotropic or azeotrope-like mixture of Z-FC-1336mzz and pentane is used as a blowing agent. Blowing agents Z-FC-1336mzz and pentane form an azeotrope-like mixture. Typically these are combined prior to mixing with the other components in the foam-forming compositions. Alternatively, one can be mixed with some or all of the other components before the other is mixed in. For example, Z-FC- 1336mzz can be first mixed with the other components in the foam-forming compositions before pentane is added in. In one embodiment, the azeotrope like mixture contains between 62-78% by weight of Z-FC-1336mzz, and 38-22% by weight of pentane. In one embodiment, the azeotrope like mixture contains between 64-76% by weight of Z-FC-1336mzz and 36-24% by weight of pentane. In one embodiment, the azeotropic mixture contains 70.2% by weight of Z-FC-1336mzz and 29.8% by weight of pentane.

The azeotropic or azeotrope-like mixtures of Z-FC-1336mzz and pentane has been described in U.S. Patent Application No. 60/930,467 [FL1394 US PRV] filed May 16, 2007, hereby incorporated by reference in its entirety.

In some embodiments of this invention, the foam-forming composition comprises: (a) an azeotropic or azeotrope-like mixture of Z-FC-1336mzz and isopentane; and (b) an active hydrogen-containing compound having two or more active hydrogens, in the form of hydroxyl groups. In this disclosure, the azeotropic or azeotrope-like mixture of Z-FC-1336mzz and isopentane is used as a blowing agent. Blowing agents Z-FC-1336mzz and isopentane form an azeotrope-like mixture. Typically these are combined prior to mixing with the other components in the foam-forming compositions. Alternatively, one can be mixed with some or all of the other components before the other is mixed in. For example, Z-FC-1336mzz can be first mixed with the other components in the foam-forming compositions before isopentane is added in. In one embodiment, the azeotrope like mixture contains between 51-70% by weight of Z-FC-1336mzz, and 49-30% by weight of isopentane. In one embodiment, the azeotrope like mixture contains between 54-67% by weight of Z-FC-1336mzz and 46-33% by weight of isopentane. In one embodiment, the azeotropic mixture contains 61.4% by weight of Z-FC-1336mzz and 38.6% by weight of isopentane.

The azeotropic or azeotrope-like mixtures of Z-FC-1336mzz and isopentane has been described in U.S. Patent Application No. 60/930,445 [FL1395 US PRV] filed May 16, 2007, hereby incorporated by reference in its entirety.

In some embodiments of this invention, the foam-forming composition comprises: (a) an azeotropic or azeotrope-like mixture of Z-FC-1336mzz and cyclopentane; and (b) an active hydrogen-containing compound having two or more active hydrogens, in the form of hydroxyl groups. In this disclosure, the azeotropic or azeotrope-like mixture of Z-FC-1336mzz and cyclopentane is used as a blowing agent. Blowing agents Z-FC-1336mzz and cyclopentane form an azeotrope-like mixture. Typically these are combined prior to mixing with the other components in the foam-forming compositions. Alternatively, one can be mixed with some or all of the other components before the other is mixed in. For example, Z-FC-1336mzz can be first mixed with the other components in the foam-forming compositions before cyclopentane is added in. In one embodiment, the azeotrope like mixture contains between 75-88% by weight of Z-FC-1336mzz, and 25-12% by weight of cyclopentane. In one embodiment, the azeotrope like mixture contains between 77-87% by weight of Z-FC-1336mzz and 23-13% by weight of cyclopentane. In one embodiment, the azeotrope like mixture contains 85% by weight of Z-FC-1336mzz and 15% by weight of cyclopentane.

The azeotropic or azeotrope-like mixtures of Z-FC-1336mzz and cyclopentane has been described in U.S. Patent Application No. 60/999,871 [FL1445 US PRV] filed Oct. 22, 2007, hereby incorporated by reference in its entirety.

In some embodiments of this invention, the foam-forming composition comprises: (a) an azeotrope-like mixture of Z-FC-1336mzz and HFC-245fa; and (b) an active hydrogen-containing compound having two or more active hydrogens, in the form of hydroxyl groups. In this disclosure, the azeotrope-like mixture of Z-FC-1336mzz and HFC-245fa is used as a blowing agent. Blowing agents Z-FC-1336mzz and HFC-245fa form an azeotrope-like mixture. Typically these are combined prior to mixing with the other components in the foam-forming compositions. Alternatively, one can be mixed with some or all of the other components before the other is mixed in. For example, Z-FC-1336mzz can be first mixed with the other components in the foam-forming compositions before HFC-245fa is added in. In one embodiment, the azeotrope-like mixture contains between 1-24% by weight of Z-FC-1336mzz, and 99-76% by weight of HFC-245fa. In one embodiment, the azeotrope like mixture contains between 3-22% by weight of Z-FC-1336mzz and 97-78% by weight of HFC-245fa. In one embodiment, the azeotrope like mixture contains 20% by weight of Z-FC-1336mzz and 80% by weight of HFC-245fa.

The azeotrope-like mixtures of Z-FC-1336mzz and HFC-245fa has been described in U.S. Patent Application No. 60/931,875 [FL1405 US PRV] filed May 24, 2007, hereby incorporated by reference in its entirety.

In some embodiments of this invention, the foam-forming composition comprises: (a) an azeotrope-like mixture of Z-FC-1336mzz and dimethoxymethane; and (b) an active hydrogen-containing compound having two or more active hydrogens, in the form of hydroxyl groups. In this disclosure, the azeotrope-like mixture of Z-FC-1336mzz and dimethoxymethane is used as a blowing agent. Blowing agents Z-FC-1336mzz and dimethoxymethane form an azeotrope-like mixture. Typically these are combined prior to mixing with the other components in the foam-forming compositions. Alternatively, one can be mixed with some or all of the other components before the other is mixed in. For example, Z-FC-1336mzz can be first mixed with the other components in the foam-forming compositions before dimethoxymethane is added in. In one embodiment, the azeotrope like mixture contains between 1-99% by weight of Z-FC-1336mzz, and 99-1% by weight of dimethoxymethane. In one embodiment, the azeotrope like mixture contains between 67-97% by weight of Z-FC-1336mzz and 33-3% by weight of dimethoxymethane. In one embodiment, the azeotrope like mixture contains 85% by weight of Z-FC-1336mzz and 15% by weight of dimethoxymethane.

The azeotrope-like mixtures of Z-FC-1336mzz and dimethoxymethane has been described in U.S. Patent Application No. 60/967,874 [FL1427 US PRV] filed Sep. 7, 2007, hereby incorporated by reference in its entirety.

As recognized in the art, an azeotropic or an azeotrope-like mixture is an admixture of two or more different components which, when in liquid form under a given pressure, will boil at a substantially constant temperature, which temperature may be higher or lower than the boiling temperatures of the individual components, and which will provide a vapor composition essentially identical to the liquid composition undergoing boiling.

For the purpose of this discussion, an azeotrope-like mixture means a composition that behaves like an azeotrope (i.e., has constant boiling characteristics or a tendency not to fractionate upon boiling or evaporation). Thus, the composition of the vapor formed during boiling or evaporation is the same as or substantially the same as the original liquid composition. Hence, during boiling or evaporation, the liquid composition, if it changes at all, changes only to a minimal or negligible extent. This is to be contrasted with non-azeotropelike compositions in which during boiling or evaporation, the liquid composition changes to a substantial degree.

Additionally, azeotrope-like compositions exhibit dew point pressure and bubble point pressure with virtually no pressure differential. That is to say that the difference in the dew point pressure and bubble point pressure at a given temperature will be a small value. In this invention, compositions with a difference in dew point pressure and bubble point pressure of less than or equal to 3 percent (based upon the bubble point pressure) is considered to be azeotrope-like.

Accordingly, the essential features of an azeotropic or an azeotrope-like composition are that at a given pressure, the boiling point of the liquid composition is fixed and that the composition of the vapor above the boiling composition is essentially that of the boiling liquid composition (i.e., no fractionation of the components of the liquid composition takes place). It is also recognized in the art that both the boiling point and the weight percentages of each component of the azeotropic composition may change when the azeotropic or azeotrope-like liquid composition is subjected to boiling at different pressures. Thus, an azeotropic or an azeotrope-like composition may be defined in terms of the unique relationship that exists among the components or in terms of the compositional ranges of the components or in terms of exact weight percentages of each component of the composition characterized by a fixed boiling point at a specified pressure. It is also recognized in the art that various azeotropic compositions (including their boiling points at particular pressures) may be calculated (see, e.g., W. Schotte Ind. Eng. Chem. Process Des. Dev. (1980) 19, 432-439). Experimental identification of azeotropic compositions involving the same components may be used to confirm the accuracy of such calculations and/or to modify the calculations at the same or other temperatures and pressures.

The active hydrogen-containing compounds of this invention can comprise compounds having two or more groups that contain an active hydrogen atom reactive with an isocyanate group, such as described in U.S. Pat. No. 4,394,491; hereby incorporated by reference. Examples of such compounds have at least two hydroxyl groups per molecule, and more specifically comprise polyols, such as polyether or polyester polyols. Examples of such polyols are those which have an equivalent weight of about 50 to about 700, normally of about 70 to about 300, more typically of about 90 to about 270, and carry at least 2 hydroxyl groups, usually 3 to 8 such groups.

Examples of suitable polyols comprise polyester polyols such as aromatic polyester polyols, e.g., those made by trans-esterifying polyethylene terephthalate (PET) scrap with a glycol such as diethylene glycol, or made by reacting phthalic anhydride with a glycol. The resulting polyester polyols may be reacted further with ethylene—and/or propylene oxide—to form an extended polyester polyol containing additional internal alkyleneoxy groups.

Examples of suitable polyols also comprise polyether polyols such as polyethylene oxides, polypropylene oxides, mixed polyethylene-propylene oxides with terminal hydroxyl groups, among others. Other suitable polyols can be prepared by reacting ethylene and/or propylene oxide with an initiator having 2 to 16, generally 3 to 8 hydroxyl groups as present, for example, in glycerol, pentaerythritol and carbohydrates such as sorbitol, glucose, sucrose and the like polyhydroxy compounds. Suitable polyether polyols can also include alaphatic or aromatic amine-based polyols.

The present invention also relates to processes for producing a closed-cell polyurethane or polyisocyanurate polymer foam by reacting an effective amount of the foam-forming compositions with a suitable polyisocyanate.

Typically, before reacting with a suitable polyisocyanate, the active hydrogen-containing compound described hereinabove and optionally other additives are mixed with the blowing agent to form a foam-forming composition. Such foam-forming composition is typically known in the art as an isocyanate-reactive preblend, or B-side composition. The foam-forming composition of this invention can be prepared in any manner convenient to one skilled in this art, including simply weighing desired quantities of each component and, thereafter, combining them in an appropriate container at appropriate temperatures and pressures.

When preparing polyisocyanate-based foams, the polyisocyanate reactant is normally selected in such proportion relative to that of the active hydrogen-containing compound that the ratio of the equivalents of isocyanate groups to the equivalents of active hydrogen groups, i.e., the foam index, is from about 0.9 to about 10 and in most cases from about 1 to about 4.

While any suitable polyisocyanate can be employed in the instant process, examples of suitable polyisocyanates useful for making polyisocyanate-based foam comprise at least one of aromatic, aliphatic and cycloaliphatic polyisocyanates, among others. Representative members of these compounds comprise diisocyanates such as meta- or paraphenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), napthylene-1,5-diisocyanate, 1-methylphenyl-2,4-phenyldiisocyanate, diphenylmethane-4,4-diisocyanate, diphenylmethane-2,4-diissocyanate, 4,4-biphenylenediisocyanate and 3,3-dimethyoxy-4,4 biphenylenediisocyanate and 3,3-dimethyldiphenylpropane-4,4-diisocyanate; triisocyanates such as toluene-2,4,6-triisocyanate and polyisocyanates such as 4,4-dimethyldiphenylmethane-2,2,5,5-tetraisocyanate and the diverse polymethylenepoly-phenylopolyisocyanates, mixtures thereof, among others.

A crude polyisocyanate may also be used in the practice of this invention, such as the crude toluene diisocyanate obtained by the phosgenating a mixture comprising toluene diamines, or the crude diphenylmethane diisocyanate obtained by the phosgenating crude diphenylmethanediamine. Specific examples of such compounds comprise methylene-bridged polyphenylpolyisocyanates, due to their ability to crosslink the polyurethane.

It is often desirable to employ minor amounts of additives in preparing polyisocyanate-based foams. Among these additives comprise one or more members from the group consisting of catalysts, surfactants, flame retardants, preservatives, colorants, antioxidants, reinforcing agents, filler, antistatic agents, among others well known in this art.

Depending upon the composition, a surfactant can be employed to stabilize the foaming reaction mixture while curing. Such surfactants normally comprise a liquid or solid organosilicone compound. The surfactants are employed in amounts sufficient to stabilize the foaming reaction mixture against collapse and to prevent the formation of large, uneven cells. In one embodiment of this invention, about 0.1% to about 5% by weight of surfactant based on the total weight of all foaming ingredients (i.e. blowing agents+active hydrogen-containing compounds+polyisocyanates+additives) are used. In another embodiment of this invention, about 1.5% to about 3% by weight of surfactant based on the total weight of all foaming ingredients are used.

One or more catalysts for the reaction of the active hydrogen-containing compounds, e.g. polyols, with the polyisocyanate may be also employed. While any suitable urethane catalyst may be employed, specific catalyst comprise tertiary amine compounds and organometallic compounds. Exemplary such catalysts are disclosed, for example, in U.S. Pat. No. 5,164,419, which disclosure is incorporated herein by reference. For example, a catalyst for the trimerization of polyisocyanates, such as an alkali metal alkoxide, alkali metal carboxylate, or quaternary amine compound, may also optionally be employed herein. Such catalysts are used in an amount which measurably increases the rate of reaction of the polyisocyanate. Typical amounts of catalysts are about 0.1% to about 5% by weight based on the total weight of all foaming ingredients.

In the process of the invention for making a polyisocyanate-based foam, the active hydrogen-containing compound (e.g. polyol), polyisocyanate and other components are contacted, thoroughly mixed, and permitted to expand and cure into a cellular polymer. The mixing apparatus is not critical, and various conventional types of mixing head and spray apparatus are used. By conventional apparatus is meant apparatus, equipment, and procedures conventionally employed in the preparation of isocyanate-based foams in which conventional isocyanate-based foam blowing agents, such as fluorotrichloromethane ($CCl_3F$, CFC-11), are employed. Such conventional apparatus are discussed by: H. Boden et al. in chapter 4 of the Polyurethane Handbook, edited by G. Oertel, Hanser Publishers, New York, 1985; a paper by H. Grunbauer et al. titled "Fine Celled CFC-Free Rigid Foam—New Machinery with Low Boiling Blowing Agents" published in Polyurethanes 92 from the Proceedings of the SPI 34th Annual Technical/Marketing Conference, Oct. 21-Oct. 24, 1992, New Orleans, La.; and a paper by M. Taverna et al. titled "Soluble or Insoluble Alternative Blowing Agents? Processing Technologies for Both Alternatives, Presented by the Equipment Manufacturer", published in Polyurethanes World Congress 1991 from the Proceedings of the SPI/ ISOPA Sep. 24-26, 1991, Acropolis, Nice, France. These disclosures are hereby incorporated by reference.

In one embodiment of this invention, a preblend of certain raw materials is prepared prior to reacting the polyisocyanate and active hydrogen-containing components. For example, it is often useful to blend the polyol(s), blowing agent, surfactant(s), catalysts(s) and other foaming ingredients, except for polyisocyanates, and then contact this blend with the polyisocyanate. Alternatively, all the foaming ingredients may be introduced individually to the mixing zone where the polyisocyanate and polyol(s) are contacted. It is also possible to pre-react all or a portion of the polyol(s) with the polyisocyanate to form a prepolymer.

The invention composition and processes are applicable to the production of all kinds of expanded polyurethane foams, including, for example, integral skin, RIM and flexible foams, and in particular rigid closed-cell polymer foams useful in spray insulation, as pour-in-place appliance foams, or as rigid insulating board stock and laminates.

The present invention also relates to the closed-cell polyurethane or polyisocyanurate polymer foams prepared from reaction of effective amounts of the foam-forming composition of this disclosure and a suitable polyisocyanate.

EXAMPLES

The present disclosure is further defined in the following Examples. It should be understood that these Examples, while indicating preferred embodiments, are given by way of illustration only. From the above discussion and these Examples, one skilled in the art can ascertain the preferred features, and without departing from the spirit and scope thereof, can make various changes and modifications to adapt it to various uses and conditions.

Polyol is a toluene diamine (o-TDA) initiated aromatic polyether polyol (VORANOL 391) purchased from Dow Chemicals Inc. at Midland, Mich., 49641-1206. Polyol has viscosity of 4740 centerpoise at 25° C. The content of hydroxyl groups in the Polyol is equivalent to 391 mg KOH per gram of Polyol.

Silicon type surfactant is a mixture of 70% polyalkyleneoxidemethylsiloxane and 30% polyalkylene oxide (Niax Silicone L-5440) purchased from Momentive Performance Materials at 187 Danbury Road, Wilton, Conn. 06897 USA.

Amine catalyst (Polycat 8) is N,N-dimethylcyclohexylamine purchased from Air Products Inc. at 7201 Hamilton Blvd, Allentown Pa. 18195.

Co-catalyst (Curithane 52) is 2-methyl(n-methyl amino b-sodium acetate nonyl phenol) purchased from Air Products Inc. at 7201 Hamilton Blvd, Allentown Pa. 18195.

Polymethylene polyphenyl isocyanate (PAPI 27) is purchased from Dow Chemicals, Inc. at Midland, Mich., 49641-1206.

Initial R-value is measured by a LaserComp FOX 304 Thermal Conductivity Meter at a mean temperature of 75° F. The unit of R-value is $ft^2$-hr-° F./BTU-in.

Example 1

Polyurethane Foam Made from Z-FC-1336mzz and Methyl formate Azeotrope-like Mixture Blowing agents Z-FC-1336mzz and methyl formate were premixed to form an azeotrope-like mixture containing 90% by weight of Z-FC-1336mzz and 10% by weight of meththyl formate.

Polyol, surfactant, catalysts, water and the blowing agent (10% by weight of methyl formate and 90% by weight of Z-FC-1336mzz) were pre-mixed by hand and then mixed with polyisocyanate. The resulting mixture was poured into a 8"×8"×2.5" paper box to form the polyurethane foam. The formulation and properties of the foam are shown in Tables 1 and 2 below.

TABLE 1

| Polyurethane formulation | |
|---|---|
| Component | Parts by weight |
| Polyol | 100 |
| Silicon type surfactant | 2.0 |
| Amine catalyst | 1.5 |
| Co-catalyst | 0.5 |
| Water | 1.0 |
| Blowing agent (90% by weight of Z-FC-1336mzz and 10% by weight of methyl formate) | 25.1 |
| Polymethylene polyphenyl isocyanate | 132 |

TABLE 2

| Polyurethane foam properties | |
|---|---|
| Foam Index | 1.22 |
| Cream time (second) | 8 |
| Rise time (seconds) | 90 |
| Tack free time (seconds) | 100 |
| Foam density (pounds-per-cubic-feet) | 2.3 |
| Initial R-value ($ft^2$-hr-° F./BTU-in) | 7.3 |

Example 2

Polyurethane Foam Made from Z-FC-1336mzz and HFC-365mfc Azeotrope-Like Mixture Blowing agents Z-FC-1336mzz and HFC-365mfc were premixed to form an azeotrope-like mixture containing 80% by weight of Z-FC-1336mzz and 20% by weight of HFC-365mfc.

Polyol, surfactant, catalysts, water and the blowing agent (20% by weight of HFC-365mfc and 80% by weight of Z-FC-1336mzz) were pre-mixed by hand and then mixed with polyisocyanate. The resulting mixture was poured into a 8"×8"×2.5" paper box to form the polyurethane foam. The formulation and properties of the foam are shown in Tables 3 and 4 below.

TABLE 3

| Polyurethane formulation | |
| --- | --- |
| Component | Parts by weight |
| Polyol | 100 |
| Silicon type surfactant | 2.0 |
| Amine catalyst | 1.5 |
| Co-catalyst | 0.5 |
| Water | 1.0 |
| Blowing agent (80% by weight of Z-FC-1336mzz and 20% by weight of HFC-365mfc) | 28.8 |
| Polymethylene polyphenyl isocyanate | 132 |

TABLE 4

| Polyurethane foam properties | |
| --- | --- |
| Foam Index | 1.2 |
| Cream time (second) | 8 |
| Rise time (seconds) | 90 |
| Tack free time (seconds) | 100 |
| Foam density (pounds-per-cubic-feet) | 2.2 |
| Initial R-value (ft$^2$-hr-° F./BTU-in) | 7.4 |

Example 3

Polyurethane Foam Made from Z-FC-1336mzz and Trans-1,2-dichloroethylene Azeotropic Mixture Blowing agents Z-FC-1336mzz and trans-1,2-dichloroethylene were premixed to form an azeotropic mixture containing 74.7% by weight of Z-FC-1336mzz and 25.3% by weight of trans-1,2-dichloroethylene.

Polyol, surfactant, catalysts, water and the blowing agent (25.3% by weight of trans-1,2-dichloroethylene and 74.7% by weight of Z-FC-1336mzz) were pre-mixed by hand and then mixed with polyisocyanate. The resulting mixture was poured into a 8"×8"×2.5" paper box to form the polyurethane foam. The formulation and properties of the foam are shown in Tables 5 and 6 below.

TABLE 5

| Polyurethane formulation | |
| --- | --- |
| Component | Parts by weight |
| Polyol | 100 |
| Silicon type surfactant | 2.0 |
| Amine catalyst | 1.5 |
| Co-catalyst | 0.5 |
| Water | 1.0 |
| Blowing agent (74.7% by weight of Z-FC-1336mzz and 25.3% by weight of trans-1,2-dichloroethylene) | 25.1 |
| Polymethylene polyphenyl isocyanate | 132 |

TABLE 6

| Polyurethane foam properties | |
| --- | --- |
| Foam Index | 1.2 |
| Cream time (second) | 11 |
| Rise time (seconds) | 90 |
| Tack free time (seconds) | 100 |
| Foam density (pounds-per-cubic-feet) | 2.1 |
| Initial R-value (ft$^2$-hr-° F./BTU-in) | 7.1 |

Example 4

Polyurethane Foam Made from Z-FC-1336mzz and Trans-1,2-dichloroethylene Azeotrope-like Mixture Blowing agents Z-FC-1336mzz and trans-1,2-dichloroethylene were premixed to form an azeotrope-like mixture containing 68% by weight of Z-FC-1336mzz and 32% by weight of trans-1,2-dichloroethylene.

Polyol, surfactant, catalysts, water and the blowing agent (32% by weight of trans-1,2-dichloroethylene and 68% by weight of Z-FC-1336mzz) were pre-mixed by hand and then mixed with polyisocyanate. The resulting mixture was poured into a 8"×8"×2.5" paper box to form the polyurethane foam. The formulation and properties of the foam are shown in Tables 7 and 8 below.

TABLE 7

| Polyurethane formulation | |
| --- | --- |
| Component | Parts by weight |
| Polyol | 100 |
| Silicon type surfactant | 2.0 |
| Amine catalyst | 1.5 |
| Co-catalyst | 0.5 |
| Water | 1.0 |
| Blowing agent (68% by weight of Z-FC-1336mzz and 32% by weight of trans-1,2-dichloroethylene) | 24.1 |
| Polymethylene polyphenyl isocyanate | 132 |

TABLE 8

| Polyurethane foam properties | |
| --- | --- |
| Foam Index | 1.2 |
| Cream time (second) | 9 |
| Rise time (seconds) | 88 |
| Tack free time (seconds) | 93 |
| Foam density (pounds-per-cubic-feet) | 2.3 |
| Initial R-value (ft$^2$-hr-° F./BTU-in) | 7.2 |

Example 5

Polyurethane Foam Made from Z-FC-1336mzz and Pentane Azeotropic Mixture

Blowing agents Z-FC-1336mzz and pentane were premixed to form an azeotropic mixture containing 70.2% by weight of Z-FC-1336mzz and 29.8% by weight of pentane.

Polyol, surfactant, catalysts, water and the blowing agent (29.8% by weight of pentane and 70.2% by weight of Z-FC-1336mzz) were pre-mixed by hand and then mixed with polyisocyanate. The resulting mixture was poured into a 8"×8"×2.5" paper box to form the polyurethane foam. The formulation and properties of the foam are shown in Tables 9 and 10 below.

TABLE 9

| Polyurethane formulation | |
| --- | --- |
| Component | Parts by weight |
| Polyol | 100 |
| Silicon type surfactant | 2.0 |
| Amine catalyst | 1.5 |
| Co-catalyst | 0.5 |
| Water | 1.0 |
| Blowing agent (70.2% by weight of Z-FC-1336mzz and 29.8% by weight of pentane) | 21.4 |
| Polymethylene polyphenyl isocyanate | 132 |

TABLE 10

| Polyurethane foam properties | |
| --- | --- |
| Foam Index | 1.2 |
| Cream time (second) | 9 |
| Rise time (seconds) | 90 |
| Tack free time (seconds) | 100 |
| Foam density (pounds-per-cubic-feet) | 2.3 |
| Initial R-value ($ft^2$-hr-° F./BTU-in) | 6.9 |

Example 6

Polyurethane Foam Made from Z-FC-1336mzz and Isopentane Azeotropic Mixture

Blowing agents Z-FC-1336mzz and isopentane were premixed to form an azeotropic mixture containing 61.4% by weight of Z-FC-1336mzz and 38.6% by weight of isopentane.

Polyol, surfactant, catalysts, water and the blowing agent (38.6% by weight of isopentane and 61.4% by weight of Z-FC-1336mzz) were pre-mixed by hand and then mixed with polyisocyanate. The resulting mixture was poured into a 8"×8"×2.5" paper box to form the polyurethane foam. The formulation and properties of the foam are shown in Tables 11 and 12 below.

TABLE 11

| Polyurethane formulation | |
| --- | --- |
| Component | Parts by weight |
| Polyol | 100 |
| Silicon type surfactant | 2.0 |
| Amine catalyst | 1.5 |
| Co-catalyst | 0.5 |
| Water | 1.0 |
| Blowing agent (61.4% by weight of Z-FC-1336mzz and 38.6% by weight of isopentane) | 19.7 |
| Polymethylene polyphenyl isocyanate | 132 |

TABLE 12

| Polyurethane foam properties | |
| --- | --- |
| Foam Index | 1.2 |
| Cream time (second) | 7 |
| Rise time (seconds) | 80 |
| Tack free time (seconds) | 90 |
| Foam density (pounds-per-cubic-feet) | 1.8 |
| Initial R-value ($ft^2$-hr-° F./BTU-in) | 6.5 |

Example 7

Polyurethane Foam Made from Z-FC-1336mzz and Cyclopentane Azeotrope-like Mixture Blowing agents Z-FC-1336mzz and cyclopentane were premixed to form an azeotrope-like mixture containing 85% by weight of Z-FC-1336mzz and 15% by weight of cyclopentane.

Polyol, surfactant, catalysts, water and the blowing agent (15% by weight of cyclopentane and 85% by weight of Z-FC-1336mzz) were pre-mixed by hand and then mixed with polyisocyanate. The resulting mixture was poured into a 8"×8"×2.5" paper box to form the polyurethane foam. The formulation and properties of the foam are shown in Tables 13 and 14 below.

TABLE 13

| Polyurethane formulation | |
| --- | --- |
| Component | Parts by weight |
| Polyol | 100 |
| Silicon type surfactant | 2.0 |
| Amine catalyst | 1.5 |
| Co-catalyst | 0.5 |
| Water | 1.0 |
| Blowing agent (85% by weight of Z-FC-1336mzz and 15% by weight of cyclopentane) | 24.5 |
| Polymethylene polyphenyl isocyanate | 132 |

TABLE 14

| Polyurethane foam properties | |
| --- | --- |
| Foam Index | 1.2 |
| Cream time (second) | 10 |
| Rise time (seconds) | 85 |
| Tack free time (seconds) | 95 |
| Foam density (pounds-per-cubic-feet) | 2.3 |
| Initial R-value ($ft^2$-hr-° F./BTU-in) | 7.3 |

Example 8

Polyurethane Foam Made from Z-FC-1336mzz and HFC-245fa Azeotrope-like Mixture Blowing agents Z-FC-1336mzz and HFC-245fa were premixed to form an azeotrope-like mixture containing 20% by weight of Z-FC-1336mzz and 80% by weight of HFC-245fa.

Polyol, surfactant, catalysts, water and the blowing agent (80% by weight of HFC-245fa and 20% by weight of Z-FC-1336mzz) were pre-mixed by hand and then mixed with polyisocyanate. The resulting mixture was poured into a 8"×8"×2.5" paper box to form the polyurethane foam. The formulation and properties of the foam are shown in Tables 15 and 16 below.

TABLE 15

Polyurethane formulation

| Component | Parts by weight |
| --- | --- |
| Polyol | 100 |
| Silicon type surfactant | 2.0 |
| Amine catalyst | 1.5 |
| Co-catalyst | 0.5 |
| Water | 1.0 |
| Blowing agent (20% by weight of Z-FC-1336mzz and 80% by weight of HFC-245fa) | 25.0 |
| Polymethylene polyphenyl isocyanate | 132 |

TABLE 16

Polyurethane foam properties

| | |
| --- | --- |
| Foam Index | 1.2 |
| Cream time (second) | 7 |
| Rise time (seconds) | 90 |
| Tack free time (seconds) | 90 |
| Foam density (pounds-per-cubic-feet) | 2.4 |
| Initial R-value (ft$^2$-hr-° F./BTU-in) | 7.1 |

Example 9

Polyurethane Foam Made from Z-FC-1336mzz and Dimethoxymethane Azeotrope-like Mixture Blowing agents Z-FC-1336mzz and dimethoxymethane were premixed to form an azeotrope-like mixture containing 85% by weight of Z-FC-1336mzz and 15% by weight of dimethoxymethane.

Polyol, surfactant, catalysts, water and the blowing agent (15% by weight of dimethoxymethane and 85% by weight of Z-FC-1336mzz) were pre-mixed by hand and then mixed with polyisocyanate. The resulting mixture was poured into a 8"×8"×2.5" paper box to form the polyurethane foam. The formulation and properties of the foam are shown in Tables 17 and 18 below.

TABLE 17

Polyurethane formulation

| Component | Parts by weight |
| --- | --- |
| Polyol | 100 |
| Silicon type surfactant | 2.0 |
| Amine catalyst | 1.5 |
| Co-catalyst | 0.5 |
| Water | 1.0 |
| Blowing agent (85% by weight of Z-FC-1336mzz and 15% by weight of dimethoxymethane) | 25.1 |
| Polymethylene polyphenyl isocyanate | 132 |

TABLE 18

Polyurethane foam properties

| | |
| --- | --- |
| Foam Index | 1.2 |
| Cream time (second) | 7 |
| Rise time (seconds) | 85 |
| Tack free time (seconds) | 105 |
| Foam density (pounds-per-cubic-feet) | 2.0 |
| Initial R-value (ft$^2$-hr-° F./BTU-in) | 6.8 |

What is claimed is:

1. A foam forming composition comprising:
    (a) a foam expansion agent comprising an azeotropic mixture of Z-1,1,1,4,4,4-hexafluoro-2-butene and a second component, wherein said second component is methyl formate, trans-1,2-dichloroethylene, or cyclopentane; and
    (b) an active hydrogen-containing compound having two or more active hydrogens.

2. The foam forming composition of claim 1, wherein the active hydrogen containing compound is a polyether polyol.

3. A closed-cell polyurethane or polyisocyanate polymer foam prepared from reaction of an effective amount of the foam-forming composition of claim 1 with a suitable polyisocyanate.

4. The closed-cell polyurethane or polyisocyanurate polymer foam of claim 3, wherein said polymer foam has an initial R-value greater than 6.0 ft$^2$-hr-° F./BTU-in.

5. A process for producing a closed-cell polyurethane or polyisocyanurate polymer foam comprising: reacting an effective amount of the foam-forming composition as in claim 1 with a suitable polyisocyanate.

6. A foam forming composition comprising:
    (a) a foam expansion agent comprising an azeotrope-like mixture of Z-1,1,1,4,4,4-hexafluoro-2-butene and a second component, wherein said second component is methyl formate, trans-1,2-dichloroethylene, cyclopentane, 1,1,1,3,3-pentafluorobutane, 1,1,1,3,3-pentafluoropropane, or dimethoxymethane; and
    (b) an active hydrogen-containing compound having two or more active hydrogens.

7. The foam forming composition of claim 6, wherein the active hydrogen containing compound is a polyether polyol.

8. A closed-cell polyurethane or polyisocyanate polymer foam prepared from reaction of an effective amount of the foam-forming composition of claim 6 with a suitable polyisocyanate.

9. The closed-cell polyurethane or polyisocyanurate polymer foam of claim 8, wherein said polymer foam has an initial R-value greater than 6.0 ft$^2$-hr-° F./BTU-in.

10. A process for producing a closed-cell polyurethane or polyisocyanurate polymer foam comprising: reacting an effective amount of the foam-forming composition as in claim 6 with a suitable polyisocyanate.

* * * * *